United States Patent Office 3,260,674
Patented July 12, 1966

3,260,674
TABLETED COMPOSITION FOR OXYGEN RELEASE
Edward J. Ross, 36 Huntleigh Woods, St. Louis 31, Mo.
No Drawing. Filed Oct. 18, 1962, Ser. No. 231,577
3 Claims. (Cl. 252—186)

This invention relates to improvements in oxygen release composition and, in particular, is concerned with a tableted composition that can be made safely under high pressure and high speed tableting conditions, and which is effective in neutralizing chlorine in chlorinated waters.

Oxygen release compositions have been proposed in the past for providing oxygen in oxygen poor waters for preservation of fish, as typified in Pemble Patent No. 2,245,495, granted June 10, 1941. I have found, however, that such compositions are difficult to prepare under the high pressure and high speed tableting operations required for commercial production, and, further, represent a dangerous condition due to possibility of explosion. By means of this invention, I have provided a composition which can be safely tableted under greatly increased pressures previously employed and under high speed conditions by the use of graphite.

I have further found that by the addition of sodium sulfite in the tableted composition, I have been able to neutralize or render inactive, free chlorine or active chlorine compounds, e.g., the chloramines found in treated water, such as the usual chlorinated city waters and the like.

Essentially, the compositions employ a standard oxygen release composition typified by barium peroxide and monocalcium phosphate, which, catalyzed by manganese dioxide, react with one another in water to liberate oxygen. This composition also contains calcium sulfate, e.g., dental plaster, as an antidote for barium to prevent barium poisoning should the composition be inadvertently taken internally by a child, or through accidental use by adults. Through the novel employment of graphite, this composition can be handled under high pressure molding techniques to form tablets or molds in any desired shape without the danger of explosion, and the tablet is of an extremely hard non-chipping characteristic that retains its shape substantially indefinitely when immersed in water. Further, by the novel addition of sodium sulfite, the composition can be used in chlorinated waters to neutralize or render ineffective the chlorine so that these waters when so treated with the novel composition of this invention can be used to preserve fish and other forms of living life to which chlorine is injurious.

Further, through the composition of this invention, I have found that besides fish I can preserve other forms of life, such as cut flowers, through the addition of oxygen to the water which greatly increases the length of time that cut flowers can be preserved without wilting. Likewise, the composition can be embedded in soil adjacent plant roots and the evolution of oxygen upwardly through the soil acts to prevent compaction of the soil and promote plant growth. The tablets in the required number may also be employed to furnish the desired amount of oxygen in chemical reactions, and, due to the fact that they release oxygen without decomposing or breaking down in their physical structure, they can be removed to withdraw the source of oxygen as desired.

Also, and as a most important feature of this invention, the composition may be molded in any desired form to be used as a fish lure or attractant to attract fish to the area in which the molded composition is employed. When used and suspended from a fishing line, the composition evolves minute bubbles of oxygen which attract fish to the area of the lure, and the molded composition can be used in connection with weights or adjacent a hook below the surface, or can be employed with a float when molded to any desired shape for affixation to the line.

The above features are objects of this invention and further objects will appear in the detailed description which follows and will be otherwise apparent to those skilled in the art.

The basic oxygen evolving composition employs monocalcium phosphate, dental plaster, manganese dioxide, and barium peroxide. In this basic composition, the barium peroxide serves as a source of oxygen when reacted with monocalcium phosphate in the presence of water. The manganese dioxide serves as a catalyst and the dental plaster, i.e., calcium sulfite, acts as an antidote to barium peroxide.

In the preparation of this basic oxygen evolving composition, there is an inherent danger of fire or explosion due to the high pressures required and the nature of high speed rotary tableting presses. The single compression system of tableting with a limited quantity of material to avoid this danger is expensive and inefficient. I have found that I can substantially eliminate the danger of fire or explosion and provide a substantially permanent tablet, which, when immersed in water, does not crumble and is of a non-chipping nature. This has been obtained through the use of powdered amorphous graphite which serves as a lubricant and provides a substantially permanent and very hard and dense tablet.

I have found that I can safely employ sodium sulfite, which is compatible with the other components in the basic oxygen evolving composition, for the neutralization of chlorine or chloramines. Chlorine and chloramines are conventionally found in treated municipal water and sodium sulfite neutralizes or removes any free or combined chlorine from these waters. Thus, the tablet can be safely employed in such water to remove the chlorine which is injurious to fish when the tablet is employed with fish or any other living organisms that are desired to be protected with the water treated with the tablet of this invention.

For the purpose of illustration of this invention, there is shown below a preferred formula.

|  | Formula | Percent |
|---|---|---|
| Sodium Sulfite | $Na_2SO_3$ | .03 |
| Mono Calcium Phosphate | $Ca(H_2PO_4)_2H_2O$ | 29.43 |
| Graphite | C | 2.92 |
| Dental Plaster | $CaSO_4 \cdot \frac{1}{2}H_2O$ | 30.16 |
| Manganese Dioxide | $MnO_2$ | 4.87 |
| Barium Peroxide | $BaO_2$ | 32.59 |
|  |  | 100.00 |

The proportion of sodium sulfite employed must be kept rather closely to the weight proportion of 0.03%, as greater proportions cause a reducing effect, which is undesirable, and lesser amounts are not effective. Should there be no chlorine or combined chlorine in the water in which the tablet is employed, the proportion used is not injurious. The monocalcium phosphate can be used in the broad range of about 20–30%, while the graphite can be varied in the ranges of 1–5%. The calcium sulfates shown in the preferred formula is used in the stoichiometric equivalent to the barium peroxide, and for any change in the barium peroxide the calcium sulfate should be varied in like proportions. The manganese dioxide can be varied within the general range of 3 to 7½% and barium peroxide can be varied between 10 to 45%. For the above formulation in the proper treatment of water for fish preservation, one seven gram tablet should be employed per gallon of water. In the above formulation, the barium peroxide is substantially 92% pure and provides an average of 8.7% by weight available oxygen, which, for one gram of barium peroxide, would provide 61 cc. of oxygen at standard conditions of temperature and pressure.

*Method of use*

The composition of this invention can vary advantageously be used for the preservation of minnows and other fish. In general, a seven gram tablet is used per gallon of water to provide approximately 120 cc. of oxygen to preserve fish for a period of four to six hours when the major portion of the oxygen is evolved. It will be understood that further oxygen is evolved past this period of time, but in decreasing amounts. As a special feature of this invention, the powdered graphite employed in the composition provides a very dense and very hard tablet, which, after the oxygen has been evolved and after the tablet has served its purpose, enables the tablet to be removed in the same form as which it was immersed, in other words, a hard dense tablet which has not crumbled or broken up, and does not present unsightly or undesirable residues in the water. In addition, any free or combined chlorine in the water where city and municipal water are employed are rendered inactive or neutralized by the sodium sulfite in the composition. Thus, the harmful effect of chlorine has been obviated.

As a further feature of this invention, the composition can be molded to any desired form so that it can be provided with a hole and threaded on a line near the hook of a fishing hook and line so that bubbles of oxygen are released to attract the fish to the line and bait. A line with the molded composition of any desired weight can be used either in still fishing or in casting. Thus, fish are attracted to the area of the oxygenated water in which the composition is employed, and the hook and line can be used in very deep waters, which are oxygen scarce, and can likewise be employed in ice fishing as an attractant. It will be understood that the invention can be molded into appropriate shape for insertion in floats, lures, weights, and other fishing gear and that the compressed tablet can be scored, notched, joined, or shaped into worms, the shape of a mouse, crickets, and the like, and even into flies or as sinkers to control the bait in still fishing. The fact that the tablet does not disintegrate and does not pollute the water or give off objectionable reaction products and is substantially insoluble is of quite significant advantage.

The invention can also be very desirably employed for the preservation of cut flowers by extending their life in vases filled with water in which the composition has been immersed. I have found that the use of such oxygenated water through the use of this composition, with any chlorine rendered inactive or removed, substantially increases the life of such cut flowers and delays their decomposition. It has been established that cut flowers keep better in cold storage and, as an explanation, for the better preservation through the use of the tablet of the composition of this invention, I have found that at a temperature of 32° F. the solubility of oxygen in fresh water is 14.62 p.p.m. and at a temperature of 86° F., more closely approximating room temperature in which cut flowers are normally kept for display, the solubility of oxygen in water is 7.63 p.p.m. Therefore, by the addition of the tablet to flower vases in which the composition is employed at room temperature, the life has been extended by increasing the oxygen content. A 5 to 10 grain tablet may be employed for this purpose for 8 ounces to one pint of water (about 16 ounces) to provide about 5 to 20 cc. of oxygen.

Further, through the use of this invention, objectionable chlorine is removed, which is advantageous for the preservation of flowers. Also, normal municipal waters are of an alkaline pH, many such municipal waters being in the order of 9.5 pH, and, through the employment of one five gram tablet per gallon of water, this pH is reduced to a substantially neutral condition in the range of 6.8 to 7.2, and I have found that such waters greatly increase the life of such cut flowers.

Also, at elevated temperatures in the house, cut flowers tend to decompose at the roots, furnishing a nutrient medium for bacteria and this in turn tends to lower the pH for untreated water to an acid pH. The addition of oxygen through the employment of the tablet appears to retard such biological growth in the flower vase. Also, the tablet provides a buffered neutral pH which is not lowered substantially upon decomposition.

I have also found that this invention can be very successfully employed for aerating house plants and improving the color and livability of such plants. This aeration prevents compaction which can incur when home and potted plants are given two or three waterings weekly which renders the surface hard and impervious. By placing a tablet a couple of inches under the dirt from the surface, slow evolution of oxygen occurs and aeration and loosening the soil is provided to prevent compaction. As an example, a 5 grain tablet yielding about 5 cc. of oxygen may be employed as a minimum for a conventional 3 inch soil pot. Larger tablet sizes may be employed which will release more oxygen which eventually, after working to resist soil compaction, will go to atmosphere. The tablet may be left indefinitely in place, or periodically removed and a fresh tablet put in again. No root damage occurs as the tablet, after the evolution of oxygen is inert. Further, in the process, no root damage by digging around the plant, as in loosening the soil conventionally, occurs. The normal soil moisture present is sufficient to activate the tablet and release the oxygen, which, in escaping, provides voids in the soil to inhibit compaction.

I have found that another important use of the composition is in organic chemical reactions where a source of oxygen is required for catalyzing organic reactions. The use of inorganic peroxides and organic peroxides, as a means of oxygenating compounds requiring heat for releasing labile oxygen, or compressed oxygen gas from cylinders, are the known methods for organic synthesis, organic preparations, and other organic reactions involving oxidation or reduction. This invention permits the release of free oxygen from the tablet when placed in the organic reaction media such as diisopropylamine, polyglycols, Cellosolve, ketones, aldehydes, and polyhydric compounds, without releasing undesirable compounds because of the nondissolving characteristics of the compressed tablet. This makes it possible to stop or start organic reactions by allowing the tablet to release the total oxygen content or by removing the tablet at timed intervals. The entire tablet surface area is available for the release of pure oxygen and this method minimizes contaminants that may be present in oxygen derived from stored compressed oxygen cylinders and the like.

Various changes and modifications may be made for the composition and methods of this invention as will be readily apparent to those skilled in the art. Such changes and modifications are within the scope and teaching of this invention as defined by the claims appended hereto.

What is claimed is:

1. A self-supporting composition of matter in the form of a compacted tablet having the ability to evolve oxygen when placed in water and the ability to neutralize any free chlorine in the water, said composition consisting essentially of about 0.03% sodium sulfite, 20 to 40% monocalcium phosphate, 1 to 5% compacted powdered amorphous graphite, 3 to 7½% manganese dioxide, 10 to 45% barium peroxide and calcium sulfate in at least the stoichiometric equivalent of the barium peroxide, all said percentages being by weight, said compacted powdered amorphous graphite serving as a self-supporting matrix to hold the tablet together after the major portion of the other components have dissolved or reacted with water.

2. A self-supporting compacted composition of matter in the form of a tablet having the ability to evolve oxygen when placed in water and the ability to neutralize any free chlorine in the water, said composition consisting essentially of about 0.03% sodium sulfite, 29.44% monocalcium phosphate, 2.92% compacted powdered amorphous graphite, 30.17% calcium sulfate, 4.87% manganese dioxide and 32.59% barium peroxide, all said percentages being by weight, said compacted powdered amorphous graphite serving as a self-supporting matrix to hold the tablet together after the major portion of the other components have dissolved or reacted with water.

3. A composition of matter in the form of a self-supporting compacted tablet having the ability to evolve oxygen when placed in water, said composition consisting essentially of about 20 to 40% monocalcium phosphate, 1 to 5% compacted powdered amorphous graphite, 3 to 7½ manganese dioxide, 10 to 45% barium peroxide and calcium sulfate in at least the stoichiometric equivalent of the barium peroxide, all said percentages being by weight, said compacted powdered amorphous graphite serving as a self-supporting matrix to hold the tablet together after the major portion of the other components have dissolved or reacted with water.

References Cited by the Examiner

UNITED STATES PATENTS

| | | | |
|---|---|---|---|
| 871,612 | 11/1907 | Neafield | 252—105 XR |
| 2,245,495 | 6/1941 | Pemble | 252—186 |
| 2,405,566 | 8/1946 | Feigley | 252—186 |
| 2,581,299 | 1/1951 | Rogers | 47—58 |
| 2,914,408 | 11/1959 | Buzzard | 99—3 |
| 2,951,761 | 9/1960 | Stephan | 99—3 |
| 2,971,292 | 2/1961 | Malecki | 47—58 |
| 3,019,557 | 2/1962 | Katchalsky et al. | 47—58 |
| 3,099,896 | 8/1963 | Kurth | 47—1 |

FOREIGN PATENTS 9,977   1843   Great Britain.

OTHER REFERENCES

Gregory: "Uses and Applications of Chemicals and Related Materials," Reinhold Pub. Co., 1939, page 305 relied on.

ALBERT T. MEYERS, *Primary Examiner.*

JULIUS GREENWALD, *Examiner.*

M. WEINBLATT, *Assistant Examiner.*